United States Patent [19]

Thelander

[11] 4,300,851
[45] Nov. 17, 1981

[54] DEVICE FOR RELEASABLY CONNECTING A FURNITURE LEG WITH A PIECE OF FURNITURE, FOR EXAMPLE A TABLE

[76] Inventor: Henry Thelander, Varnamo, Sweden

[21] Appl. No.: 50,238

[22] Filed: Jun. 20, 1979

[51] Int. Cl.³ ............................................. F16M 11/16
[52] U.S. Cl. .................................... 403/319; 248/188; 403/290
[58] Field of Search .......................... 248/188, 188.8; 403/381, 319, 290, 315

[56] References Cited
U.S. PATENT DOCUMENTS

| | | | |
|---|---|---|---|
| 1,520,519 | 12/1924 | Thomason | 248/188 |
| 3,556,451 | 11/1971 | Ostlund | 248/188 |
| 4,169,297 | 10/1979 | Weihrauch | 403/290 XR |

Primary Examiner—Andrew V. Kundrat
Attorney, Agent, or Firm—Pollock, Vande Sande & Priddy

[57] ABSTRACT

A device for releasably connecting a furniture leg with a piece of furniture wherein the leg has displaceable portions which are displaceable from and against each other under the influence of a locking member which is adapted to displace the displaceable portions of the leg from a position where connection means on the displaceable portions do not or only incompletely engage connection means on the furniture, to a locked position wherein the connection means on the leg and furniture are in complete engagement with each other and the furniture leg is connected with the piece of furniture.

5 Claims, 8 Drawing Figures

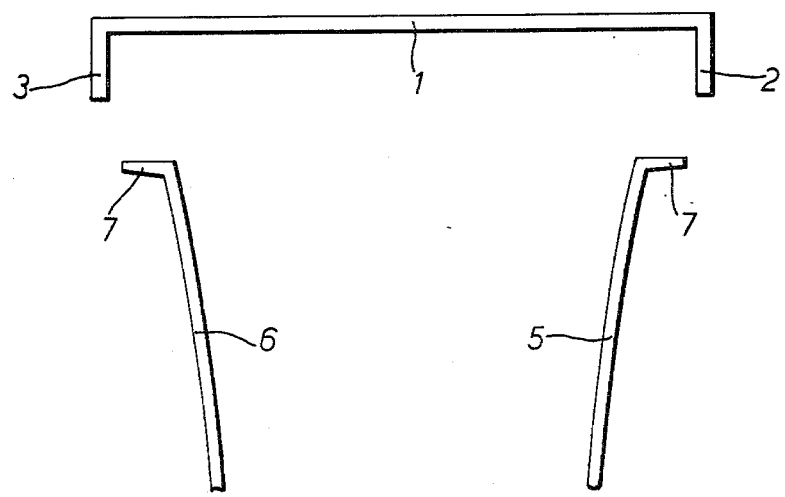
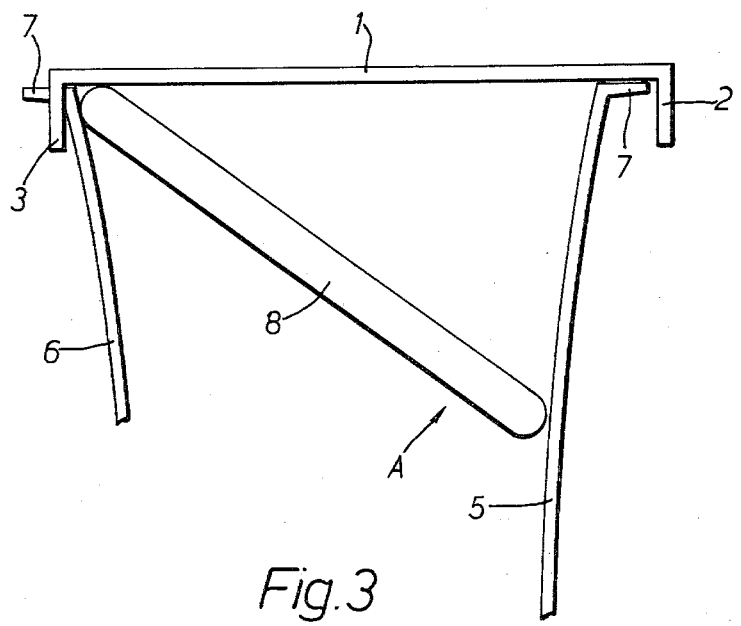

DEVICE FOR RELEASABLY CONNECTING A FURNITURE LEG WITH A PIECE OF FURNITURE, FOR EXAMPLE A TABLE

In furniture manufacturing it is often required that portions projecting from a piece of furniture, for example the legs of a table, can be connected with the piece of furniture and can be disassembled therefrom in a simple way. Such a constructional feature is important especially with regard to the fact that said feature makes it easier to transport the furniture but also with regard to the fact that the furniture shall be designed so as to offer a good flexibility and possibilities of providing furniture combinations which are adapted to the individual requirements.

There have been suggested many solutions to the above problems. In one construction the lower side of a table is provided with fittings having openings for receiving lugs or similar projections which are positioned on portions of the leg which are displaceable in relation to each other. When connecting such a furniture leg with the fittings the lugs are introduced into the corresponding openings by deforming said displaceable portions of the leg in relation to each other, whereupon said portions are released, the spring action of the portions returning the portions to such positions that the lugs are introduced into the openings of the fittings and are retained therein. In order to maintain a secure connection between the furniture leg and the fittings it is necessary that said spring force for introducing the lugs into the openings is great. In practice this object is provided by manufacturing at least the upper portions of the leg from a flexible material.

The above construction has the drawback that the force required for counteracting the spring force of the upper portions of the leg when mounting the leg is substantial which provides that the connection of the leg can take place only with substantial difficulties. In spite of the great spring force it is impossible to prevent the connection of the leg from being deteriorated because of for example vibrations. This is because of the fact that the above construction is for its function in addition to the great spring force required also dependent on a very high accuracy as to the manufacturing of the lugs and the openings therefor.

The object of the present invention is to provide a device for releasably connecting a furniture leg with a piece of furniture, the device being of such a kind that the above drawbacks of previously known constructions are obviated.

In order to comply with this object there is according to the present invention provided a connection device comprising connection means, wherein said displaceable portions of the furniture leg are displaceable from and against each other under the influence of a locking member which is adapted to displace said displaceable portions of the leg from a position, wherein said connection means do not or only incompletely engage each other to a locked position wherein said connection means are in complete engagement with each other and the furniture leg is connected with the piece of furniture.

In an embodiment of the invention the piece of furniture is provided with fittings having two groups of opposite openings provided in shanks depending from the lower side of the piece of furniture, said openings being adapted to receive lugs which are substantially parallel with the lower side of the piece of furniture and are positioned on two displaceable shanks of the leg. In this embodiment it is preferred that the locking element is disc shaped and adapted to be introduced between the shanks of the leg for pressing the shanks from each other and taking a locking position parallel with the lower side of the piece of furniture in contact therewith or a plate connecting the shanks of the fittings.

In order to maintain the locking element in its locked position it is preferred that the portions of the leg adjacent the lugs thereon converge in downwards direction so that there is between said portions and the disc of the fitting formed an undercut space into which the locking element is introduceable and lockable by elastic deformation of the upper portions of the leg and/or the locking element.

The invention is described in the following with reference to the accompanying drawings.

FIG. 2 is a side view of a connection device according to the invention in the position according to FIG. 1.

FIG. 3 is a side view of a connection device according to the invention at the initial phase of the assembling.

Figure 1:
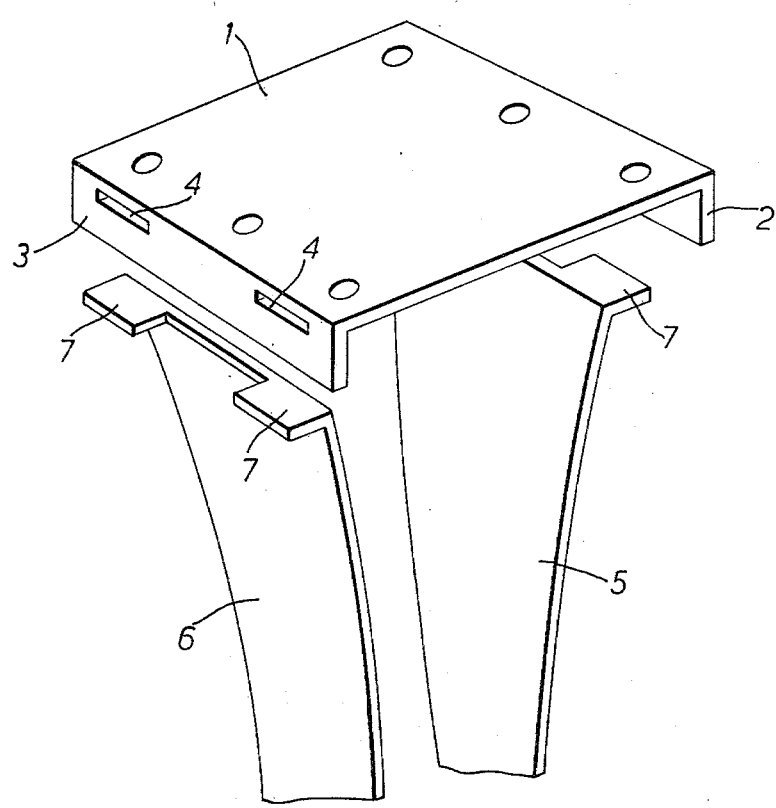
FIG. 1 shows a connection device according to the invention comprising a fitting adapted to be fixed to the lower surface of a piece of furniture and an upper portion of a furniture leg adapted to cooperate with the fitting.

As appears from FIG. 1 the connection device according to the invention comprises a fitting having a disc 1 which is intended to be fastened against the lower side of a piece of furniture by means of for example screws. From the disc 1 there extend two depending shanks 2 and 3, respectively, which are substantially perpendicular to the disc and substantially parallel with each other. Each shank 2 and 3 is provided with a group of openings 4, the shank 3 having two openings in the embodiment shown in FIG. 1. Also the shank 2 has two corresponding openings which are, however, not shown in the drawing. It is, of course, possible that the shanks can be provided with a different number of openings. The upper portion of a furniture leg is formed with two shanks 5 and 6, respectively, which are displaceable from and against each other under the influence of a rather small force. The upper ends of the shanks are provided with projecting lugs 7 which are formed so as to be receivable in the openings 4 of the fitting. In the assembled position of the furniture leg the shanks 5 and 6 are positioned between the shanks 2 and 3 of the fitting, the lugs 7 being received in the openings 4 in the shanks of the fitting.

As appears from FIG. 2 the distance between the opposite edges of the lugs 7 is somewhat less than the inner space between the shanks 2 and 3 of the fitting. However, this relationship between said distances is not of any special importance as it is presupposed that the shanks 5 and 6 of the leg are easily displaceable in relation to each other under the influence of a manual force. This displaceability of the shanks 5 and 6 can be provided either by connecting the shanks 5 and 6 with the rest of the leg by means of pivots or by manufacturing said shanks from such a material or forming said shanks in such a way that they are flexible themselves. It also appears from FIG. 2 that the lugs 7 have a somewhat wedge-shaped cross-section.

When the furniture leg shall be mounted in the fitting 1, the lugs 7 of the shank 6 are placed in the openings of the shank 3 of the fitting, as shown in FIG. 3. Thereupon a locking element 8 is positioned with an edge in the corner defined by the disc 1 of the fitting and the shank 6 of the leg. Preferably the locking element is of rectangular shape. By turning the locking element 8 in the direction of the arrow A the shank 5 of the leg is forced outwards so that the lugs 7 thereof are introduced into the openings 4 of the shank 2 of the fitting. In this position the locking element 8 has taken a position half-way between the positions according to FIGS. 3 and 4. When the turning of the locking element 8 is continued in the direction of the arrow A the locking element will snap into the undercut space defined by the uppermost portions of the shanks 5 and 6 of the legs and the disc 1 of the fitting (see FIG. 4). This snap action is according to the invention preferably provided either by the fact that the locking element is manufactured from any elastically deformable material or by the fact that the material of the shanks 5 and 6 is slightly deformed. It is, of course, also possible that the snap action is provided by means of a combination of the above types of deformation.

Figure 4:
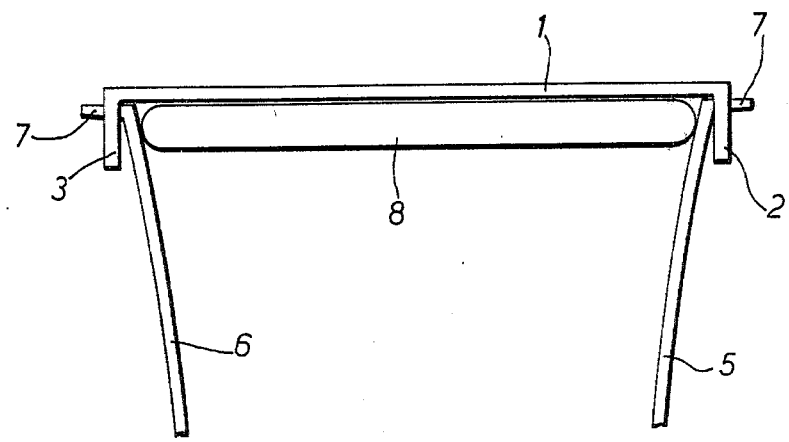
FIG. 4 is a side view showing the connection device after the assembling.

In FIG. 4 the furniture leg is shown in an assembled position in the fitting. From FIG. 4 appears that the locking element 8 is received in an undercut space which is defined by the downwards converging portions of the shanks 5 and 6 of the leg and the disc 1 of the fitting. In this position the shanks 5 and 6 are forced in the direction from each other which in turn provides that the lugs 7 have no possibility of leaving their engagement with the openings of the shanks 2 and 3 of the fitting or to be loose therein. In order to maintain a firm pressing of the shanks 5 and 6 outwards against the shanks 2 and 3 of the fitting it is according to the invention suitable that the locking element 8 is manufactured from a relatively hard but somewhat elastic material which provides for a secure maintaining of the retaining of the locking element and a substantial engagement force between the shanks of the leg and the shanks of the fitting.

Figure 5:
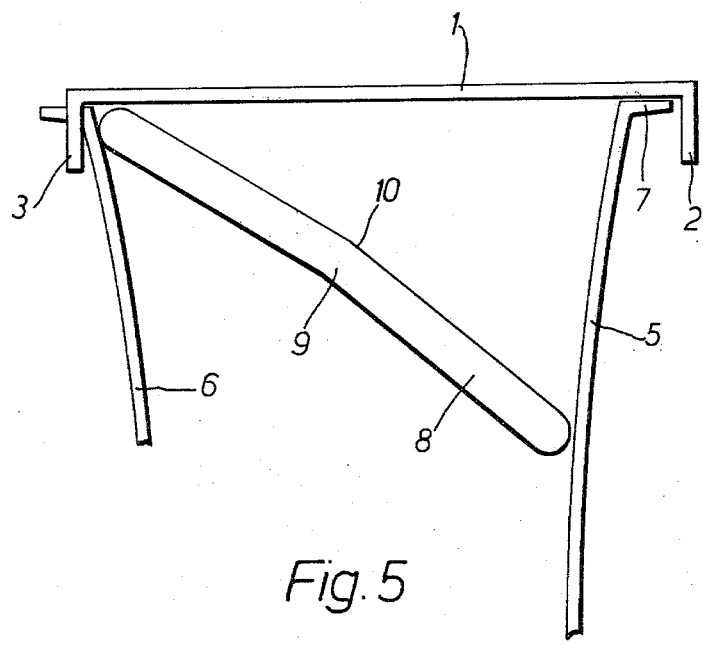
FIG. 5 is a side view of a modified embodiment of the invention corresponding to FIG. 3.

In FIG. 5 there is shown a somewhat modified embodiment of the locking element 8. According to this embodiment the locking element is not exactly flat but has a curved central portion 9 so that the upper surface of the locking element is provided at its cental portion with a hunch 10 which engages the disc 1 of the fitting when the locking element is turned upwards in the direction of the arrow A in FIG. 3. By the fact that the locking element is manufactured from a rigid and somewhat elastic material the end portions of the locking element will be forced downwards from the disc 1, that is in the direction in which the shanks 5 and 6 of the leg converges. Thereby there is created an increased tensional force outwards against the two shanks 5 and 6 of the leg.

Figure 6:
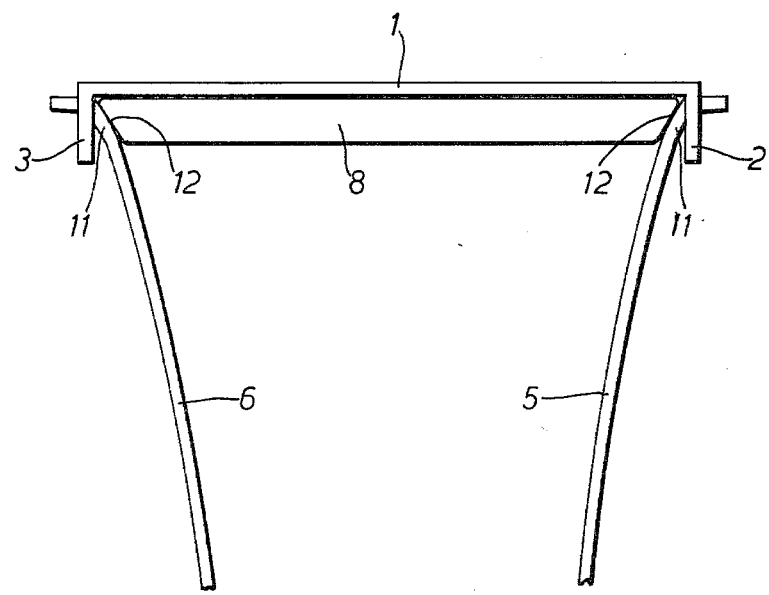
FIG. 6 is a side view of a further modified embodiment of a connection device according to the invention in the assembled state.

In FIG. 6 there is shown a further modified embodiment of the connection device according to the invention. As appears from the drawing the shanks 5 and 6 of the leg have in this embodiment portions 11 which are angularly bent just below the lugs 7 which makes the converging angle of the undercut space substantially steeper adjacent the disc 1 of the fitting. In this embodiment the locking element 8 is provided with end edges 12 which are inclined so that said edges can substantially completely contact said angularly bent portions 11 of the shanks 5 and 6 of the leg. In this embodiment it is hardly possible to turn the locking element 8 to the locking position in accordance with the method shown in FIG. 3 at the arrow A. On the contrary it is necessary to move the locking element into correct position by moving the element parallelly with the plane of the disc 1 of the fitting. In order to improve the tensional force in this embodiment it is possible to give the locking element a somewhat wedge-shaped design in the direction of introduction. According to the invention it is also possible to provide the shanks 2 and 3 of the fitting with a corresponding wedge-shape and to give the shanks 5 and 6 of the leg a corresponding shape whereby the wedge-shape can be small so as not to have any influence on the appearance of the furniture leg.

Figure 7:
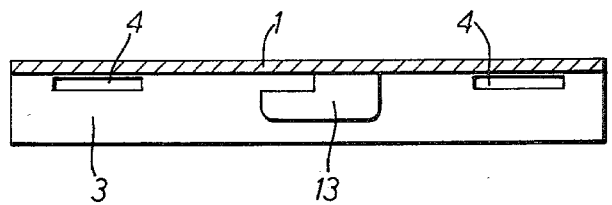
FIGS. 7 and 8 show a further different embodiment of the invention.
Figure 8:
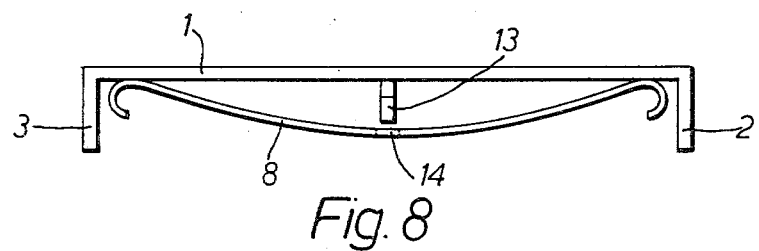

In a modified embodiment of the invention shown in FIGS. 7 and 8 the disc 1 is provided with a downwards directed hook 13 which is adapted to engage a slot-shaped opening 14 in the locking element. As appears from FIG. 8 the locking element is in its non-tensioned state extending as an arc in the direction from the disc 1 and the hook 13, the locking element consisting of an elastic material, for example metal or plastic. After the shanks 5 and 6 of the leg have been positioned in the openings 4 and the locking element 8 has been placed in the position as shown in FIG. 8 the central portion of the locking element is forced against the disc so that the hook will extend through the opening 14 whereupon the locking element is displaced so that the hook will engage the edge of the opening. The locking element is in this position retained by the hook, the radius of the locking element being substantially greater and the end portions being displaced from each other so that the shanks 5 and 6 of the leg are firmly pressed to engagement with the shanks 2 and 3 of the fitting and the lugs 7 are fixed in the openings 4.

The invention can be modified within the scope of the following claims. Thus, it is possible to fix the position of the locking element 8 for example by providing the central portion of the locking element with a threaded through opening, wherein a screw is provided. When tightening this screw the locking element will be pressed downwards from the disc 1 of the fitting, whereby the expansion force of the shanks 5 and 6 of the leg will be improved because of the convergence thereof, the locking element 8 being at the same time securely fixed in the correct position.

According to the present invention it is also possible that the lugs 7 of the shanks 5 and 6 of the leg engage the openings 4 of the fitting from outside. In this embodiment the locking element 8 is not introduced between the shanks 5 and 6 but will suitably be formed as a yoke or the like which is from the outside forced against the shanks 5 and 6 so that these are pressed against the shanks 2 and 3 of the fitting. In this embodiment it is preferred that the shanks 5 and 6 are at their upper portions diverging in the direction from the disc 1 of the fitting, so that the yoke is retained in its locking position.

I claim:

1. A device for releasably connecting a furniture leg with a piece of furniture, wherein the furniture is provided with connection means adapted for engaging complementary connection means in the leg, said furniture connection means comprising a fitting having two groups of openings provided in shanks depending from the lowest side of the piece of furniture, said openings being adapted to receive lugs which are substantially parallel with the lower side of the piece of furniture, the connection means of the leg being provided on upper displaceable shank portions of the leg, and being lugs which are substantially parallel to the lower side of the piece of furniture, and wherein said displaceable shank portions of the leg are displaceable from each other under the influence of a disk-shaped locking element which is adapted to displace said portions of the leg from a position wherein said connection means are out of engagement or incompletely in engagement with each other to a locked position wherein the connection means are in complete engagement with each other and a leg is connected with the piece of furniture, said disk-shaped locking element being adapted to be introduced between the shanks of the leg for forcing the legs from each other, and taking a locking position parallel to the lower side of the piece of furniture.

2. A device as claimed in claim 1 wherein the upper portions of the legs adjacent said lugs converge in a downwards direction so that there is provided between said portions and the part of the fitting connecting the shanks of the fitting an undercut space into which the locking element is introducable and lockable by elastic deformation of one or both of the upper portions of the leg and the locking element.

3. A device as claimed in claim 2 wherein the locking element is made of a rigid but somewhat elastic material and wherein it has a curved central portion, whereby an increased tensional force is directed outwardly against the two leg shank portions.

4. A device as claimed in claim 2 wherein the leg shank portions are angularly bent near the top thereof so as to make said undercut space have a relatively steep converging angle, and wherein the edges of said disk-shaped locking element are shaped to have a similar angle, so that said disk fits snuggly between said shank portions when in said undercut space.

5. A device as claimed in claim 2 wherein the lower side of the part of the fitting connecting the shanks has a downwardly directed hook secured thereto and wherein said locking element is a tensionable locking element capable of assuming a non-tensioned state wherein it does not forceably abut said leg shank portions and a tensioned state in which it does forceably abut said shank leg portions, said locking element having an opening for engaging said hook, said hook serving to retain said locking element in said tensioned state.

* * * * *